(12) United States Patent
Lilja et al.

(10) Patent No.: US 10,848,422 B2
(45) Date of Patent: Nov. 24, 2020

(54) SYSTEM AND A METHOD FOR HANDLING DATA

(71) Applicant: Napatech A/S, Søborg (DK)

(72) Inventors: Michael Milde Lilja, Virum (DK); Claus Ek, Farum (DK)

(73) Assignee: Napatech A/S, Søborg (DK)

( * ) Notice: Subject to any disclaimer, the term of this patent is extended or adjusted under 35 U.S.C. 154(b) by 112 days.

(21) Appl. No.: 15/839,216

(22) Filed: Dec. 12, 2017

(65) Prior Publication Data

US 2018/0167322 A1 Jun. 14, 2018

(30) Foreign Application Priority Data

Dec. 13, 2016 (EP) .................................... 16203803

(51) Int. Cl.
| | | |
|---|---|---|
| *H04L 12/741* | (2013.01) | |
| *H04L 12/855* | (2013.01) | |
| *H04L 12/721* | (2013.01) | |
| *H04L 29/12* | (2006.01) | |
| *H04L 12/26* | (2006.01) | |
| *H04L 29/06* | (2006.01) | |

(52) U.S. Cl.
CPC ............ *H04L 45/745* (2013.01); *H04L 43/18* (2013.01); *H04L 45/72* (2013.01); *H04L 47/2466* (2013.01); *H04L 61/103* (2013.01); *H04L 69/14* (2013.01)

(58) Field of Classification Search
None
See application file for complete search history.

(56) References Cited

U.S. PATENT DOCUMENTS

| | | |
|---|---|---|
| 5,191,578 A | 3/1993 | Lee |
| 6,532,088 B1 | 3/2003 | Dantu et al. |
| 6,566,541 B2 | 5/2003 | Liu et al. |
| 6,947,384 B2 | 9/2005 | Bare |
| 6,959,151 B1 | 10/2005 | Cotter et al. |

(Continued)

FOREIGN PATENT DOCUMENTS

| | | |
|---|---|---|
| WO | WO069126 | 11/2000 |
| WO | WO13188790 | 12/2013 |

OTHER PUBLICATIONS

Zhang, W. et al, "Experimental demonstration of 10 gigabit ethernet-based optical interconnection network interface for large-scale computing systems", IEEE Xplore, Columbia University, New York, Article No. 978-1-4244-8938-1/11, DOI: 10.1109/PHO.2011. 6110617, (Dec. 2011).

(Continued)

*Primary Examiner* — Jeffrey M Rutkowski
*Assistant Examiner* — Basil Ma
(74) *Attorney, Agent, or Firm* — McHale & Slavin, P.A.

(57) ABSTRACT

A system and a method for receiving data packets at the inputs of two data handlers. Each data handler compares address data in the individual data packet with a first and a second list of addresses and forward packets to each other, so that data packets with one of the first addresses are fed to one data handler and packets with one of the second addresses are fed to the other data handler. The data handlers output the data packets received so that one data handler outputs all packets with addresses of the first addresses and the other data handler outputs all packets with addresses of the second addresses.

18 Claims, 2 Drawing Sheets

(56) References Cited

U.S. PATENT DOCUMENTS

| | | | |
|---|---|---|---|
| 6,993,023 B2 | 1/2006 | Foster et al. | |
| 6,996,058 B2 | 2/2006 | Foster et al. | |
| 7,012,895 B1 | 3/2006 | Mir | |
| 7,042,877 B2 | 5/2006 | Foster et al. | |
| 7,068,666 B2 | 6/2006 | Foster et al. | |
| 7,068,667 B2 | 6/2006 | Foster et al. | |
| 7,164,656 B2 | 1/2007 | Foster et al. | |
| 7,376,138 B1 | 5/2008 | Cotter | |
| 7,561,522 B1 | 7/2009 | Cotter | |
| 7,602,818 B2 | 10/2009 | Dao et al. | |
| 7,764,621 B1 * | 7/2010 | Busch | H04L 49/555 370/249 |
| 2002/0159437 A1 | 10/2002 | Foster et al. | |
| 2004/0083299 A1 * | 4/2004 | Dietz | H04L 29/06 709/230 |
| 2010/0039987 A1 | 2/2010 | Hegde et al. | |
| 2010/0142371 A1 | 6/2010 | Gooch et al. | |
| 2010/0157963 A1 | 6/2010 | Choi et al. | |
| 2013/0208721 A1 | 8/2013 | Armstrong et al. | |
| 2013/0208722 A1 | 8/2013 | Armstrong et al. | |
| 2014/0003454 A1 * | 1/2014 | Kaemmerer | H04L 12/417 370/503 |

OTHER PUBLICATIONS

Hughes-Jones, R. et al, "Performance of 1 and 10 gigabit ethernet cards with server quality motherboards", University of Manchester, UK, Future Generation Computer Systems—Special Issue: High-speed networks and services for data-intensive grids: The DataTAG project, vol. 21(4), pp. 469-488, (Apr. 2005).

Gerew, B., "The claim contingency: how if-then language can sink a patent", NAPP blog, Raleigh, NC, Internet article retrieved Oct. 1, 2019 : https://www.napp.org/index.php?option=com_dailyplanetblog&view=entry&category=uncatagorized&id=7:the-claim-contiongency-how-if-then-language-can-sink-a-patent, pp. 1-4, XP055627811, (Nov. 27, 2018).

* cited by examiner

SYSTEM AND A METHOD FOR HANDLING DATA

PRIORITY CLAIM

In accordance with 37 C.F.R. § 1.76, a claim of priority is included in an Application Data Sheet filed concurrently herewith. Accordingly, the present invention claims the benefit of the priority of European Patent Application No. 16203803.8, filed Dec. 13, 2016, the contents of which the above referenced application is incorporated herein by reference.

FIELD OF THE INVENTION

The present invention relates to a system and a method for handling data and in particular to a system and a method for receiving data from two or more data channels and forwarding this to one or more processors.

BACKGROUND OF THE INVENTION

Systems of this type may be seen in: US2014/003454, US2004/083299, U.S. Pat. No. 7,012,895, US20100157963, US20020159437, WO2013/188790, WO2000/69126, US20100142371, US20130208722, U.S. Pat. Nos. 6,532,088, 6,556,541, 5,191,578, US20100039987, "Performance of 1 and 10 Gigabit ethernet cards with server quality motherboards"; Citeseer X, Dept. Of Physics and astronomy, The university of Manchester; Richard Hughes-Jones, Peter Clarke Steven . . . et al; and "Experimental demonstration of 10 gigabit ethernet-based optical interconnection network interface . . . "; CiteseerX, Department of electrical Engineering, Columbia University; Wenjia Zhang, Ajay S. Garg, et al.

SUMMARY OF THE INVENTION

In a first illustrative embodiment, the invention relates to a system comprising:
  a first data handler having:
  a first data input,
  a second data input,
  a first data output,
  a second data output,
  a first combining element configured to output first information to the first data output, and
  a first analyzer configured to receive data packets from the first data input and output second information relating to a data packet received by the first data input to the first combining element or the second data output,
  a second data handler having:
  a third data input,
  a fourth data input,
  a third data output,
  a fourth data output,
  a second combining element configured to output third information to the third data output, and
  a second analyzer configured to receive data packets from the third data input and output fourth information relating to a data packet received by the third data input to the second combining element or the fourth data output,
where:
  the first combining element is configured to receive the second information and the fourth information and generate, on the basis thereof, the first information,
  the second combining element is configured to receive the fourth information and the second information and generate, on the basis thereof, the third information,
  the first analyzer and the second analyzer are configured to receive data packets having therein a plurality of address data fields each representing an address,
  the first analyzer is configured to output the second information relating to a packet:
    to the first combining element, if the data packet comprises one or more address data fields representing one or more first addresses and
    to the second data output, if the packet comprises one or more address data fields representing one or more second addresses,
  the second analyzer is configured to output the fourth information relating to a packet:
    to the fourth output, if the packet comprises one or more address data fields representing one or more of the one or more first address(es) and
    to the second combining element, if the packet comprises one or more address data fields representing the one or more second address(es).

In the present context, the data handlers may be formed or embodied as separate, physical elements, such as PCI cards, PCMCIA cards, or such as elements comprising their own housings. Naturally, the data handlers may be provided as a single unit, such as a single card or within a single housing if desired.

Each data handler may be embodied as one or more computer chips, servers, FPGAs, ASICs, processors, controllers, DSPs or the like. If more elements are provided, these may communicate to interchange data via wireless and/or wired communication, such as IR, RF, WiFi, Bluetooth communication and/or via a standard data bus, such as a FireWire bus, a PCI bus, conductive elements on a PCB or the like, or a data connection of any type. Any type of protocol may be used, such as Ethernet communication. Naturally, a data handler may be embodied as a single chip, as may both data handlers if desired.

The communication between the data handlers may be as that described above.

Naturally, different types of communication may be used. Thus, the first and third data inputs may be of different types and/or be of a different type than the second and fourth data inputs.

Preferably, the first and third data inputs are configured to receive data packets comprising one or more data fields each representing an address or identity. In this context, a data packet may be any type of a data unit to be transmitted on or transported by a network, data cable, data bus, trunk, or the like. Normally, a data unit conforms to one or more data standards, such as the Ethernet standard being an umbrella under which a number of different standards or data packet types exist, such as UDP and TCP data packets. A data packet usually has a number of different information fields, items or types, such as address data, payload or the like, which are each positioned at well-defined or known positions within the data packet. Such positions and types will typically differ from data packet type to data packet type, but usually, the data packet type, and thus the positions of individual contents thereof, may be determined from the actual data packet, where after the individual data items, such as address data and/or payload, may be derived, altered, and/or used in e.g. an analysis of the data packet.

An address or an address field may be represented in any desired manner. A portion of an address may be used if desired. Also, subnets may be taken into account.

The first and second analyzers are configured to receive data packets from the first and third inputs, respectively. The analyzers output second/fourth information relating to each data packet received. This second/fourth information may be the complete data packet received, a portion of a data packet received and/or information derived from the data packet received. Naturally, the contents of the second/fourth information may vary from data packet type to data packet type, such as depending on a type of encoding or encapsulation of the packet, or depending on whether the data packet comprises e.g. a predetermined address or an address within a predetermined group of addresses.

If the second/fourth information comprises only a portion of a packet, this portion may be selected based on what is eventually desired output as the first/third information. If only a portion of a packet is desired output, a remainder of the packet may be deleted in order to e.g. save bandwidth on the first and/or third outputs.

In addition, the analyzer may output different portions of data packets to the combining element of the same data handler or to the second/fourth outputs. In one situation, the communication between the second data output and the fourth data input and between the fourth data output and the second data input may be packet based, such as Ethernet communication, so that it is desired to transport full packets there between, whereas only a portion of data packets may be output to the combining element of the same data handler.

Packet based communication and/or analysis may comprise error checks and checks of the integrity of the packet as well as a determination of which protocol the packet conforms to, etc. In that process, the address field(s) of the packet may be identified and analyzed.

In Ethernet communication, the inputs/outputs usually comprise standard MACs.

Naturally, any other type of communication may be used. For example, the analyzers may derive the address information/field and provide it in a particular position in the second/fourth information or they may generate packet-type information where relevant portions of the original packet are provided in predetermined positions in the second/fourth information before outputting this information.

The analyzers are configured to determine whether to output the second/fourth information to the combining element of the same data handler or, via the second/fourth inputs/outputs, to that of the other data handler. In some situations, the second/fourth information may be sent to both combining elements.

Naturally, an analysis may be made to determine whether a first and/or second address is comprised in a data field in the packet.

The first and second addresses may be predetermined in the manner that the addresses are determined and thus identified, before a packet is received and thus compared to the addresses. Naturally, the first and second addresses may be dynamic in that e.g. first addresses may be added or removed, so that packets are compared to the presently identified and maintained first/second addresses.

This determination is based on address field(s) in the packets received. According to the invention, the second/fourth information relating to packets comprising one or more address data fields representing one or more of the one or more first address(es) is sent to the first combining element and to the second combining element if the packet comprises one or more address data fields representing one or more second addresses.

Then, second/fourth information relating to packets with e.g. one of the first address(es) are fed to the first combining element irrespective of whether the packets were received on the first or third data inputs. Then, second/fourth information relating to packets of the same session(s) may be fed to the same one of the first and third data outputs. Usually, a number of packets sequentially transmitted from a transmitter to a receiver is denoted a flow. A flow may be identified from packets having a predetermined transmitter and/or receiver. A session usually is the packets of two oppositely directed flows between one transmitter/receiver and another transmitter/receiver. A session then may be identified from packets having the same pair of receiver and transmitter.

In one situation, the first and second addresses are non-overlapping. Thus, second/fourth information relating to the same flow or session may be forwarded to only one of the first and second combining elements.

Naturally, if information relating to a packet comprises e.g. a first address, it may be required that the "if" sentence then forwards this information to the pertaining combiner or output. Thus, the "if" sentence should be seen as an instruction and not merely a possibility of this forwarding, if the information represents the first address.

If a packet is received which does not comprise information relating to a first or a second address, the packet may be discarded. Alternatively, the packet may be forwarded to a predetermined one of the first or second combining element.

Naturally, any type of address filtering may be used. In addition, it may be dynamic.

A particular manner of handling addresses is to use a so-called hash function into which an address or a multiple of addresses of the packet are fed. The output is a result of a mathematical function on the addresses. This reduces the result space from the number of possible addresses to a predetermined number of hash function results. This makes the address management easier but will at the same time treat a number of packets the same, as the addresses therein, even when not identical, will generate the same hash output.

The first and/or second addresses may be selected in any manner, such as so as to define individual flows/sessions. When a packet is received representing a hitherto unknown flow/session, address data may be derived from the packet, such as by the analyzer, and introduced into the first or second addresses so that future packets from the same flow/session are now known, and the analyzers know where to provide the corresponding second/fourth information.

In general, the first/second addresses, or information representing these, may be stored in a storage common to the first and second analyzers or in separate storages of the analyzers. In the latter situation, a controller or the like may be provided for ensuring that the two storages are synchronized. Thus:

the first data handler may have a first storage comprising information relating to the one or more first predetermined addresses and the one or more second addresses and the second data handler may have a second storage comprising information relating to the one or more first predetermined addresses and the one or more second addresses, the system could then further comprise a controller for altering the contents of the first and second storages.

Naturally, a connection, such as a communication path, a conductor, a cable or the like, may exist between the controller and the first/second data handlers or the first/second storage in order for the controller to control first/second addresses therein. Naturally, the connection may be embodied by the controller controlling a processor or the like in the handlers, so that the processors actually update the addresses in the storages.

Also, the first and second analyzers may then be configured to (such as connected to) read the first/second addresses from the common storage or the first/second storages.

In one situation, the amount of data output by the first and third outputs may be monitored, or it may be determined how busy processors are which receive this data. If a processor is too busy (or has too little to do), or an amount of data is too high or too low, data which is presently fed to one output may be fed to the other. In practice this means moving one or more addresses from the first predetermined addresses to the second ones—or vice versa.

The combining elements are configured to receive the second information and the fourth information and therefrom generate and output the first or third information, respectively.

This combination, naturally, may be the outputting of any second and fourth information received in the order of receipt.

In one embodiment, the first combining element is configured to generate the first information on the basis of an analysis of the second information from the first analyzer and the fourth information from the second analyzer.

Then, the first information could comprise a result of the analysis.

Naturally, the second combining element could be the same, so that the second combining element could be configured to generate the third information on the basis of an analysis of the second information from the first analyzer and the fourth information from the second analyzer. Then, the third information could comprise a result of this analysis.

This analysis may, for example, be an error check.

Naturally, the first/third information may simply be the second/fourth information received by the combiner(s). The first/third information thus may be a sequence of the second/fourth information received by the pertaining combining element. In the first/third information, the second/fourth information may be added in an order of receipt of the second/fourth information or of the pertaining packets by the analyzers or on the first and third inputs.

The analyzers may comprise time stampers configured to provide timing information into the packets received. This timing information may be further introduced into the second/fourth information in order for the combiners to utilize this information for e.g. ordering the second/fourth information represented in the first/third information (see further below). Alternatively, the analyzers may output the second/fourth information in a desired order, which is then maintained by the combiners.

Alternatively, the first/third information may be derived from the second/fourth information by introducing, in the pertaining first/third information, only a portion of the second/fourth information or only second/fourth information relating to some packets. The first/third information may have any format, such as a constant flow of bits, packet-based information, or the like.

In addition, an order of outputting the second/fourth information, or a part thereof, relating to individual packets as the first/third information, may be altered. It may, for example, be desired to group second/fourth information relating to data packets having a particular address, such as a receiver address and/or a transmitter address, therein. In this manner, second or fourth information relating to data packets of e.g. the same flow or session may be grouped and output from the first and third outputs. This is an advantage when the information output from the first and third outputs is fed to a processor for further analysis. In this situation, the processor may receive information relating to a number of correlated packets so that it does not have to alter between different flows/sessions so often.

Thus, the first combining element is configured to generate the first information by collecting second and/or fourth information relating to a plurality of packets comprising one or more address fields representing a predetermined first one of the first addresses and/or the second combining element is configured to generate the third information by collecting second and/or fourth information relating to a plurality of packets comprising one or more address fields representing a predetermined second one of the second addresses.

As is indicated above, the first and third information output from the first and third outputs may be used for a number of purposes. One such use or purpose is seen when the system further comprises:

a first controller configured to receive and analyze the first information and a second controller configured to receive and analyze the third information.

Then, the analyzers may, by the first/second addresses, define which second/fourth information is fed, in the form of the first/third information, to the first controller and which is fed to the second controller. Naturally, the controllers may be built-in in the present system, such as formed by the same chips, ASICs etc, or they may be separate there from but communicating with the data handlers. This communication, as described, may be in accordance with any protocol and take place on any type of medium, wired or wireless, data bus or the like.

The analysis of the controllers may be defined individually in the controllers. The analysis may be the same or different. Different controllers may be adapted to analyze information relating to particular types of data packets, and such data packets may be identified by the analyzers so as to be fed, via the combiners, to the controllers.

Part of the desired analysis may be performed in the combiners, as described above, in order to off-load the controllers.

A second illustrative embodiment of the invention relates to a method of forwarding data, the method comprising:

a first data handler:

receiving one or more packets on a first data input, generating second information relating to a received packet, receiving, on a second data input, fourth information from a second data handler, if the received packet comprises one or more address data fields representing one or more first addresses, outputting, on a first data output, first information generated from the second information and the fourth information, if the packet comprises one or more address data fields representing one or more second addresses, outputting the second information to the second data handler, the second data handler:

receiving one or more packets on a third data input, generating the fourth information relating to a received packet, receiving, on a fourth data input, the second information from the first data handler, if the received packet comprises one or more address data fields representing one or more of the first address(es), outputting the fourth information to the first data handler and if the packet comprises one or more address data fields representing one or more of the second addresses, outputting, on a third data output, third information generated from the fourth information and the second information.

In this respect, a data handler may be as that described with reference to the first aspect of the invention.

Each data handler receives packets from the first or third data input, respectively, and generates second and fourth information, respectively, from such packets. Some of the second/fourth information is kept within the data handler and some is output to the other data handler. The data handlers also receive second/fourth information from the other data handler and combines this with the second/fourth data kept within the data handler to form the first and third information, respectively, which is then output. Thus, the method may be carried out by the system of the first aspect of the invention.

Again, the second/fourth information derived from each data packet may simply be the complete data packet, a portion thereof or separate information derived from the data packet. Portions of the data packet, which are not required later on, may not form part of the second/fourth information in order to save bandwidth in the data transfer steps.

As mentioned above, the addresses may be used for ensuring that the second/fourth information relating to packets forming part of the same flow/session are provided in the same, such as the first, information, for example. Then, the information relating to data packets of a particular flow is received by—and output from—the same combiner.

As mentioned above, the data handlers may each have information relating to the first and second addresses, respectively, or a common set of information may be maintained from which the data handlers may determine what to do with the corresponding second/fourth information.

Again, the generation of the first and/or third information from the second/fourth information may be a simple combination thereof, such as by simply outputting the second/fourth information, such as in an order of receipt thereof.

Alternatively, the generation of the first and/or third information may be made from an analysis of the second/fourth information. This analysis may be a simple error check and/or correction. Alternatively, portions of the second/fourth information may be removed before converting the remainder into the first/third information.

Also, as mentioned above, a pre-analysis of the second/fourth information may be performed to assist e.g. controllers receiving and further analyzing the first/third information. Such an analysis may be e.g. a determination of an encapsulation/encoding, type, protocol, or the like of the datapacket from which the second/fourth information is derived. Another analysis may be the performing of a function of parts of the data packet or second/fourth information, such as a hash of address fields therein.

When the step of outputting the first/third information comprises generating the first/third information from an analysis of the second information and the fourth information, the first/third information preferably comprises a result of the analysis. In this manner, a subsequent controller may not need to perform this analysis, as the result is already provided to it.

In one embodiment, the step of outputting the first/third information comprises collecting second and/or fourth information relating to a plurality of packets comprising one or more address fields representing a predetermined first one of the first/second predetermined addresses and outputting the collected second/fourth information as a group of information.

In this situation, the data handler collects or groups second/fourth information when generating the first/third information.

Situations exist where a subsequent controller analyzing the first/third information analyzes e.g. flows or sessions of data packets represented in the first/third information. When the controller analyzes multiple such flows/sessions, it may be in-efficient if the controller must often alter between which flow/session is analyzed. It may be more efficient if the information provided to the controller relates not to single data packets from individual flows/sessions but instead comprises information from a plurality of packets from the same flow/session. The data handlers may identify and group the second/fourth information relating to such data packets and forward, as the first/third information, such collected information.

Thus, the data handlers may be configured to store received second/fourth information, such as in queues of individual flows/sessions/addresses, and to forward the collected information at a predetermined point in time, such as when the earliest information stored in the queue has reached a certain age (been stored there for a predetermined period of time) and/or when a sufficient amount of data (such as representing a predetermined number of data packets) has been reached. Then, the queue may be emptied by either directly forwarding the contents to the first/third output or by converting this information into the first/third information. This conversion may be any analysis, adaptation or the like.

In one embodiment, the method further comprises the step of time stamping the packet(s) received by the first and second data handlers, where the first and/or third information comprises at least portions of the data packets of the second and fourth information. Naturally, the time stamp may be added to the received packet or may simply later be incorporated in the second/fourth information relating to that data packet.

A time stamp may comprise any type of information relating to a point in time. Naturally, this may be yyyy.mm.dd.hh.mm.ss:xxxx, but in many systems, the time is an integer, which is incremented at a predetermined frequency and allowed to wrap around when reaching a maximum value.

This time stamp may be incorporated into the second/fourth information and fed to the combiner or combining step, which may perform the combination on the basis of the time stamp, such as in order to determine an order of the second/fourth information in the first/third information. Thereafter, the time stamp may be removed from the second/fourth information if desired.

Alternatively or additionally, the time stamp may be introduced also into the first/third information in order for it to be e.g. used in a subsequent analysis of the first/third information.

DETAILED DESCRIPTION OF THE INVENTION

In the following, preferred embodiments will be described with reference to the drawings.

Figure 1:
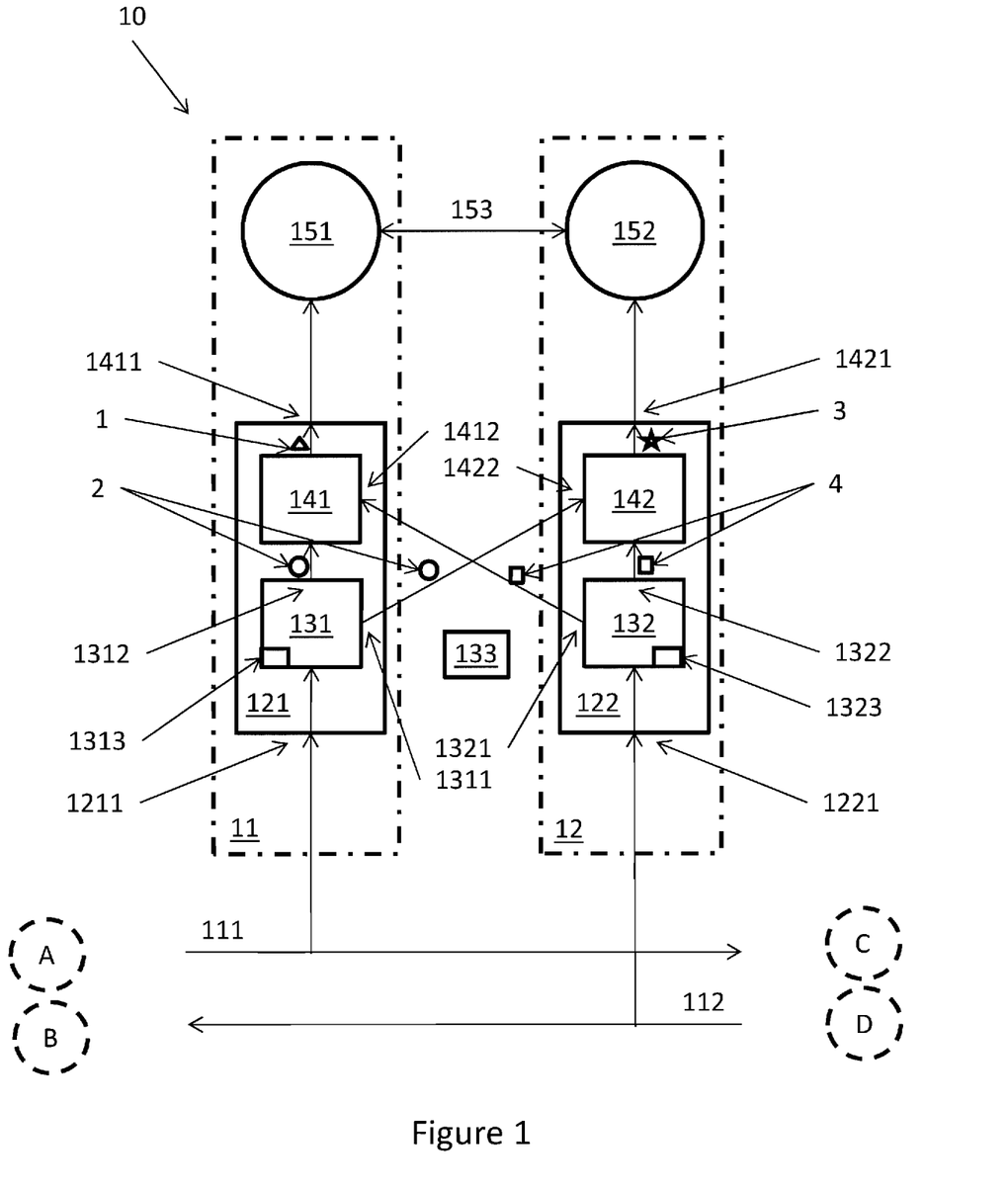
FIG. 1 illustrates main components of a system according to the invention.

In FIG. 1, a system 10 is illustrated where two entities A and C, such as two computers, servers or the like, correspond with each other via two data connections. The data connection 111 transports data in a first direction and the data connection 112 transports data in the opposite direction.

This data connection typically transports data from a number of pairs of entities where one of the entities of a pair is positioned at one end of the data connections and the other entity of the pair at the other end. Thus, one entity of each pair will receive data on the data connection 111 and forward data on the data connection 112, and the other entity of each pair will receive data on the connection 112 and output to the data connection 111.

In the drawing, entities A and B are illustrated at one end and C and D at the other end. At each end of the data connections, one or more network elements/entities, such as routers, may be present connecting the data connections to e.g. one or more entities (as A-D) or networks connecting the network elements to other networks or elements.

Usually, the data connections 111 and 112 are co-extending, such as in the same cable (electrical or optical) or in separate cables provided in the vicinity of each other.

Such communication between entities, such as A and C, may be any type of communication, such as internet browsing, mail correspondence, file download/sharing/transfer, telephone conversations, video conferences, TV/media/video sharing/download/streaming or the like. Even in the situation where the entity A streams or uploads a file or media data from the entity C, the entity A also usually transmits data, such as acknowledgement data, to C.

Clearly, A may be communicating with both C and D, and B may be communicating at the same time with e.g. D.

The data communicated usually is packet-based where individual packets are forwarded from e.g. A to C with the information desired conveyed.

Figure 2:
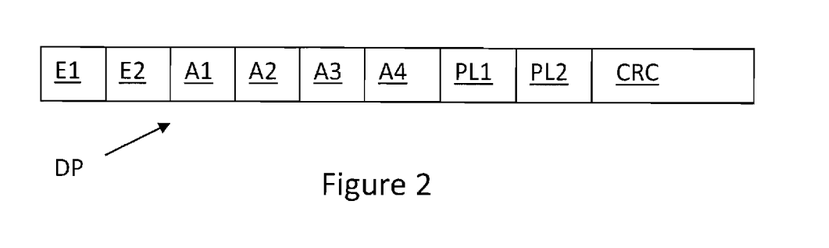
FIG. 2 illustrates a generic type of data packet.

In FIG. 2, a general structure of a data packet, DP, is seen. An Ethernet package, for example, may have one of a large number of structures, as a large number of individual data packet standards fall within the general term "Ethernet".

Ethernet data packets may be transported at layer 3 and/or layer 4. Layer 3 transport requires the data packet to have a layer 3 transmitter address and a layer 3 receiver address. Usually, layer 4 packets have additional address fields. Thus, an Ethernet data packet, DP, may have a number of addresses A1-A4. In addition, the data packet may have a payload, PL, and error correcting data, CRC. A number of other fields or information types may be present, depending on the actual standard and type of data transmitted.

In addition, the packet DP may have different types of encapsulation, such as one or more MPLS and/or VLAN encapsulations, illustrated at E1 and E2, which are also identifiable at particular positions (bits) in the data packet DP.

As the individual types of Ethernet packages are standardized, the skilled person will know these and be able to determine, from any data package, to which standard or protocol the packet applies/conforms and where in the data packet the individual types of data are presented.

The packets usually have an address identifying the transmitter of the packet and an address identifying the receiver thereof. Multiple transmitter addresses may be provided, such as when the data packet is forwarded via other entities, such as switches, routers or the like. One address, in Ethernet packets, may be an IP address identifying the real transmitter A, whereas an entity via which the data packet is forwarded between the real transmitter and the real receiver may be identified as another transmitter and may be identified by its MAC address. The same applies for the receiver(s). MAC addresses are usually altered each time the packet passes an entity on its way from the real transmitter to the real receiver, whereas the IP addresses may remain unchanged.

Packets from A may be forwarded to C via different intermediate entities. In such situations, the data packets may have different MAC addresses but the same IP addresses.

Reverting to FIG. 1, the system 10 further comprises two sub-systems or data handlers 11 and 12 which in this embodiment may be identical or have the same function.

The sub-system 11 comprises an input 1211 receiving the data or a copy thereof, transported on the data connection 111. This data is fed to an input of an element 121 and into an analyzer 131 performing an analysis of the data received. In the analyzer 131, the data received is divided into two portions of which a first portion is forwarded to a combiner 141 of the element 121. The other portion is output to a combiner 142 of the sub-system 12.

The combiner 141 is configured to receive data from the analyzer 132 of the sub-system 12 and combine this with the portion of the data received from the analyzer 131 and output the combined data to an output 1411 and to a processor 151 configured to perform an additional analysis of the data output by the combiner 141.

Clearly, the processor 152 receives, from the output 1421 and the combiner 142, data which has been received partly from the analyzer 132 and partly from the analyzer 131. The processor 152 may be configured to perform the same type of analysis as the processor 151 or another type of analysis.

The analyzers 131 and 132 are configured to transmit to the combiner 141 only first portions of data packets to/from a predetermined group of entities, such as A. Thus, the analyzers 131/132 may analyze the data packets received. If an address in the packet identifies A, the analyzer 131 will output the second information 2 from that packet to the combiner 141 for it to reach the processor 151. If, on the other hand, the analyzer 132 receives a packet having an address identifying A, it will output the fourth information 4 on the output 1321 to the combiner 141 for it to reach the processor 151.

For other entities or addresses, the fourth information 4 may be forwarded by the analyzer 132 to the combiner 142 and the second information 2 and from the analyzer 131 to the combiner 142.

Thus, all packets to and from a receiver/transmitter may be output to the outputs 1411/1421 as first information 1 or third information 3 and forwarded to the same processor 151/152, whereby such packets need not be interchanged by the processors using e.g. a standard QPI communication 153. Such communication drains resources from the processors and slows their operation.

Even though it is in principle possible to forward all packets to all combiners such that the two processors receive all packets, it is preferred to identify, for each processor 151/152 a separate list of entities/identies, where the lists are mutually exclusive so that any packet is forwarded to only one processor.

Naturally, an entity, for example A, may forward packets to multiple entities and/or receive packets from multiple entities, so that some of the packets forwarded to or transmitted by A may be fed to one processor and other packets to other processors. Thus, the analysis of a packet may be performed not only on the basis of one address therein but multiple addresses, such as both a transmitter address and a receiver address. Thus, all packets with a tupple of addresses, such as a transmitter address and a receiver address, may be fed to the same processor.

Then, the processor identified or allocated may be allocated on the basis of how busy the processors are. This allocation may take place when a new packet is received for the first time with this tupple, or re-allocation of a flow of packets may take place, if the allocated processor becomes too busy.

A widely used manner of dividing addresses into groups or into outputs is to use a hashing function into which the address(es) is/are fed, the output then being used for grouping the packets into a fewer number of groups than the possible number of address (or sets of addresses). In the present context, any hashing function may be used on any address field(s), the output of the hashes may then be used for determining to which combining element to feed the information. The hashing result may also be used for e.g. the grouping of the information in the combiners (if used) instead of the address information itself.

Preferably, the tupples or addresses are identified in storages available to the analyzers 131/132. This may be a common storage 133 from where the analyzers may gain knowledge, in relation to a newly received packet, as to where to send it. Alternatively, the analyzers 131/132 may have separate storages 1313/1323 with this information. A central controller (could then be 133) may then be provided for synchronizing such storages and for determining, for a received packet with an address or a tupple not hitherto allocated, to which processor to allocate it to.

In one situation, the full packets, or only a portion thereof, are output from the analyzers 132/131 to the combiners 141/142. This portion would typically relate to the analysis of the processors. If the processors base their analysis on only a portion of the packets, only this portion need be forwarded to the processors.

The combiners 141/142 act to receive the packets or portions from the analyzers and forward these packets or portions to the individual processor. This combination may be a simple feeding of the received packets/portions to the outputs 1411/1421, or an additional processing may take place.

This processing may be an ordering of the packets/portions in a predetermined order, such as an order of receipt by the combiner or an order of receipt of the packets by the inputs 1211/1221, which may be facilitated by the subsystems comprising time stampers for adding time stamps to the packets, where the analyzers 131/132 forward such time stamps to the combiners.

In addition, the combiners may perform an analysis or adaptation of the packets/portions fed to the processors in order to assist the processors.

In one situation, the order of receipt is less important when multiple data packets from the same transmitter/receiver (tupple) are received, where it may be desired to group such packets/portions and feed such groups to the processor. Naturally, the packets/portions of a group may be ordered in the order of receipt, but packets/portions from other transmitters/receivers (tupples) may be delayed during the gathering of a group of packets/portions. This may be desired in situations where the processor is the most efficient when the packets/portions received are grouped in that manner.

In another situation, if a particular analysis is always desired of the individual packets/portions, such as a hashing of addresses therein, a determination of an encoding/encapsulation or the like, this analysis may be performed in the combiner in order to not require also this analysis performed by the processor. The result of the analysis, such as the result of the hashing or the type of encoding/encapsulation may be fed to the processor together with, or as a part of, the packet/portion.

Naturally, the combiner may also add portions to the packet/portion or delete portions therefrom before transmitting the resulting packet/portion to the processor.

The invention claimed is:

1. A system comprising:
   a first data handler comprising:
      a first data input,
      a second data input,
      a first data output,
      a second data output,
      a first combining element configured to output first information to the first data output, and
      a first analyzer configured to receive data packets from the first data input and output second information relating to a data packet received by the first data input to the first combining element or the second data output,
   a second data handler comprising:
      a third data input,
      a fourth data input,
      a third data output,
      a fourth data output,
      a second combining element configured to output third information to the third data output, and
      a second analyzer configured to receive data packets from the third data input and output fourth information relating to a data packet received by the third data input to the second combining element or the fourth data output, where:
   the first combining element is configured to receive the second information and the fourth information and generate, on the basis thereof, the first information,
   the second combining element is configured to receive the fourth information and the second information and generate, on the basis thereof, the third information,
   the first analyzer and the second analyzer are configured to receive data packets having therein a plurality of address data fields each representing an address,
   the first analyzer is configured to output the second information relating to a packet:
      to the first combining element, if the data packet comprises one or more address data fields representing one or more first addresses and
      to the second data output, if the packet comprises one or more address data fields representing one or more second addresses, the first and second addresses being non-overlapping,
   the second analyzer is configured to output the fourth information relating to a packet:
      to the fourth output, if the packet comprises one or more address data fields representing one or more of the one or more first address(es) and
      to the second combining element, if the packet comprises one or more address data fields representing the one or more second address(es).

2. The system according to claim 1, wherein the first combining element is configured to generate the first information on the basis of an analysis of the second information from the first analyzer and the fourth information from the second analyzer.

3. The system according to claim 2, wherein the first information comprises a result of the analysis.

4. The system according to claim 1, wherein the first combining element is configured to generate the first information by collecting second and/or fourth information relating to a plurality of packets, which comprise one or more address fields representing a predetermined first one of the first addresses.

5. The system according to claim 1, wherein the second combining element is configured to generate the third information by collecting second and/or fourth information relating to a plurality of packets, which comprise one or more address fields representing a predetermined second one of the second addresses.

6. The system according to claim 1, further comprising a time stamper configured to time stamp the data packets received.

7. The system according to claim 6, wherein the first or second combining element is configured to generate the first information as a sequence of second and fourth information relating to an order of receipt of the pertaining data packets.

8. The system according to claim 6, wherein the second combining element is configured to generate the third information as a sequence of second and fourth information relating to an order of receipt of the pertaining data packets.

9. The system according to claim 1, further comprising a storage comprising information relating to the one or more first predetermined addresses and the one or more second predetermined addresses.

10. The system according to claim 1, where:
the first data handler has a first storage comprising information relating to the one or more first predetermined addresses and the one or more second predetermined addresses and
the second data handler has a second storage comprising information relating to the one or more first predetermined addresses and the one or more second predetermined addresses,
the system further comprising a controller for altering the contents of the first and second storages.

11. The system according to claim 1, further comprising:
a first controller configured to receive and analyze the first information and
a second controller configured to receive and analyze the third information.

12. A method of forwarding data, the method comprising:
a first data handler:
receiving one or more packets on a first data input, generating second information relating to a received packet, receiving, on a second data input, fourth information from a second data handler,
determining if the received packet comprises one or more address data fields representing one or more first addresses, if so outputting, on a first data output, first information generated from the second information and the fourth information,
determining if the packet comprises one or more address data fields representing one or more second addresses, if so outputting the second information to the second data handler, the first and second addresses being non-overlapping,
the second data handler:
receiving one or more packets on a third data input, generating the fourth information relating to a received packet, receiving, on a fourth data input, the second information from the first data handler,
determining if the received packet comprises one or more address data fields representing one or more of the first address(es), if so outputting the fourth information to the first data handler and
determining if the packet comprises one or more address data fields representing one or more of the second addresses, if so outputting, on a third data output, third information generated from the fourth information and the second information.

13. The method according to claim 12, wherein the step of outputting the first information comprises generating the first information from an analysis of the second information and the fourth information.

14. The method according to claim 13, wherein the first information comprises a result of the analysis.

15. The method according to claim 12, wherein the step of outputting the first information comprises collecting second and/or fourth information relating to a plurality of packets each comprising one or more address fields representing a first one of the first predetermined addresses and outputting the collected second/fourth information as a group of information.

16. The method according to claim 12, wherein the step of outputting the third information comprises collecting second and/or fourth information relating to a plurality of packets each comprising one or more address fields representing a first one of the second predetermined addresses and outputting the collected second/fourth information as a group of information.

17. The method according to claim 12, further comprising the step of time stamping the packet(s) received by the first and second data handlers, where the first information comprises at least portions of the data packets of the second and fourth information.

18. The method according to claim 12, further comprising the step of time stamping the packet(s) received by the first and second data handlers, where the third information comprises at least portions of the data packets of the second and fourth information.

* * * * *